United States Patent
Inoue et al.

(10) Patent No.: US 8,020,466 B2
(45) Date of Patent: Sep. 20, 2011

(54) UMBILICAL-MEMBER PROCESSING STRUCTURE FOR INDUSTRIAL ROBOT

(75) Inventors: Toshihiko Inoue, Minamitsuru-gun (JP); Kazutaka Nakayama, Minamitsuru-gun (JP); Takatoshi Iwayama, Minamitsuru-gun (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 576 days.

(21) Appl. No.: 12/169,951

(22) Filed: Jul. 9, 2008

(65) Prior Publication Data
US 2009/0032649 A1 Feb. 5, 2009

(30) Foreign Application Priority Data

Jul. 30, 2007 (JP) ................................. 2007-197752

(51) Int. Cl.
*B25J 19/00* (2006.01)
(52) U.S. Cl. .................... 74/490.02; 74/490.06; 901/29; 901/42; 901/49
(58) Field of Classification Search ............... 74/490.02, 74/490.06; 248/49, 62; 901/41, 42, 49, 29
See application file for complete search history.

(56) References Cited

U.S. PATENT DOCUMENTS

| | | | |
|---|---|---|---|
| 4,499,784 A | 2/1985 | Shum | |
| 4,708,580 A * | 11/1987 | Akeel | 414/735 |
| 5,816,108 A * | 10/1998 | Obata et al. | 74/490.05 |
| 5,887,800 A * | 3/1999 | McClosky | 239/587.1 |
| 6,578,800 B2 | 6/2003 | Stefan | |
| 7,202,442 B2 | 4/2007 | Nakagiri et al. | |
| 2004/0070203 A1 | 4/2004 | Karlinger | |
| 2004/0261562 A1 * | 12/2004 | Haniya et al. | 74/490.02 |
| 2005/0103148 A1 | 5/2005 | Inoue et al. | |
| 2006/0104790 A1 | 5/2006 | Inoue et al. | |
| 2006/0243087 A1 * | 11/2006 | Krogedal | 74/490.05 |
| 2007/0012672 A1 | 1/2007 | Inoue et al. | |

(Continued)

FOREIGN PATENT DOCUMENTS

CN 1706603 12/2005

(Continued)

OTHER PUBLICATIONS

Chinese Office Action issued Jan. 15, 2010 in Chinese Application No. 200810128014.

(Continued)

*Primary Examiner* — William C Joyce
(74) *Attorney, Agent, or Firm* — Drinker Biddle & Reath LLP

(57) ABSTRACT

An umbilical-member processing structure for an industrial robot which includes a forearm having a tool managing and relaying device and a wrist with proximal end rotatably connected to the forearm and having a work tool mounted on the distal end thereof, with an umbilical-member connected to the work tool being disposed to run along the wrist via the tool managing and relaying device: wherein the forearm has a first reduction gear which reduces the rotational speed of a driving source to drive the forearm in rotation; the first reduction gear having a first insertion hole for passing the umbilical-member therein; and wherein the wrist comprises a first wrist element having a through-path in communication with the first insertion hole and rotatably connected to the forearm, and a second wrist element having a second insertion hole in communication with the through-path and rotatably connected to the first wrist element.

4 Claims, 16 Drawing Sheets

U.S. PATENT DOCUMENTS

2009/0200432 A1   8/2009   Inoue et al.

FOREIGN PATENT DOCUMENTS

| | | |
|---|---|---|
| DE | 102 44 027 A1 | 4/2004 |
| DE | 10 2004 033 330 A1 | 2/2006 |
| EP | 1 163 986 A2 | 12/2001 |
| EP | 1 243 384 A1 | 9/2002 |
| EP | 1 398 552 A1 | 3/2004 |
| EP | 1 579 963 A1 | 9/2005 |
| EP | 1 640 121 A1 | 3/2006 |
| JP | 58-59785 | 4/1983 |
| JP | 2003-159689 | 6/2003 |
| JP | 2004-306072 | 11/2004 |
| JP | 2005-144610 | 6/2005 |
| JP | 2005-238428 | 9/2005 |
| JP | 2005-271003 | 10/2005 |
| JP | 2005-342860 | 12/2005 |
| JP | 2007-021636 | 2/2007 |
| WO | 2004/082898 A2 | 9/2004 |

OTHER PUBLICATIONS

Japanese Notice of Reasons for Rejection mailed Dec. 2, 2008 issued in Japanese Patent Application No. 2007-197752.

European Search Report mailed Sep. 22, 2008 issued in European Patent Application No. 08012301.1.

* cited by examiner

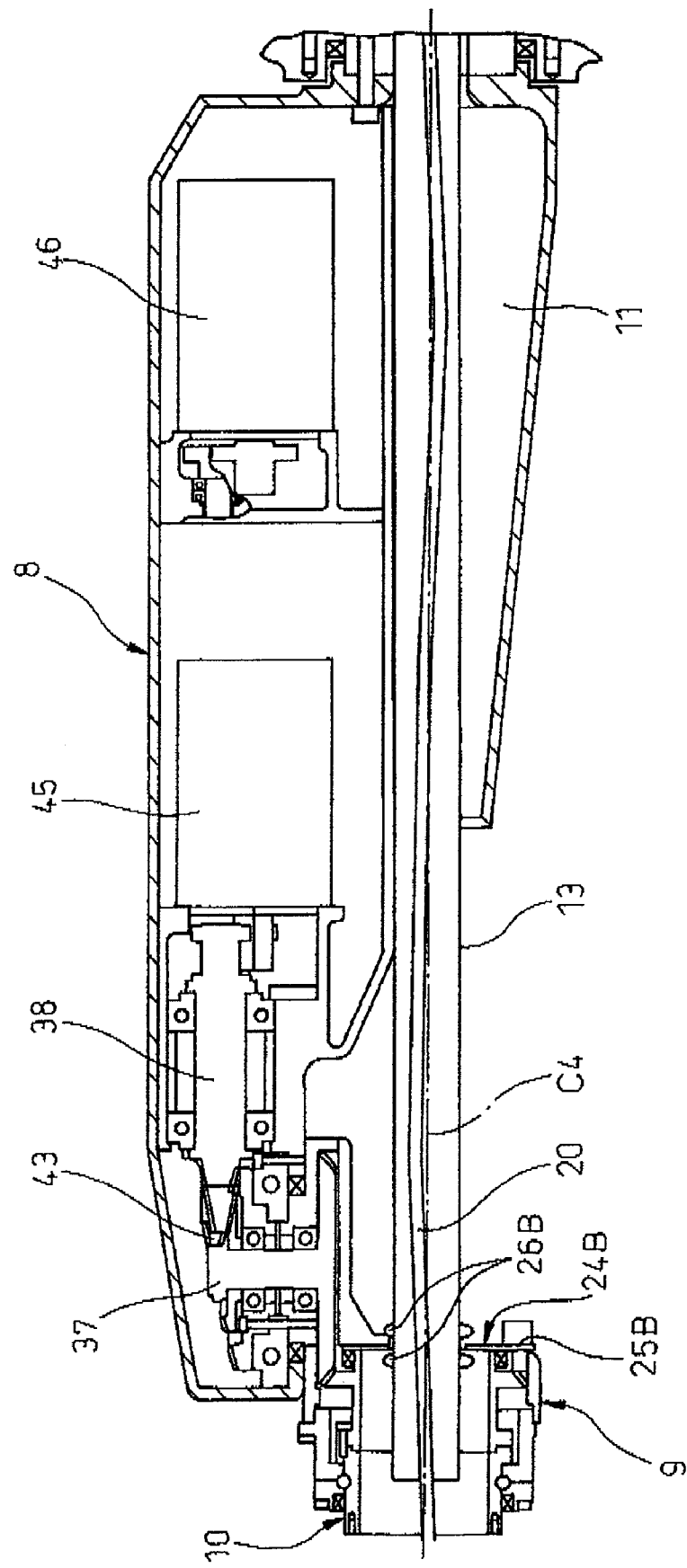

UMBILICAL-MEMBER PROCESSING STRUCTURE FOR INDUSTRIAL ROBOT

CROSS REFERENCE TO RELATED APPLICATIONS

This application claims priority to Japanese Patent Application No. 2007-197752, filed Jul. 30, 2007.

BACKGROUND OF THE INVENTION

1. Field of the Invention

The present invention relates to an umbilical-member processing structure for an industrial robot in which an umbilical-member connected to a work tool that is mounted on a distal end of a wrist, are disposed to run along the wrist via a tool managing and relaying device mounted on a forearm.

2. Description of Related Art

In general, as an industrial robot in which an umbilical-member connected to a work tool, are disposed to run along a wrist, a so-called umbilical-member-containing robot having the umbilical-member passed inside a hollow portion of the forearm and inside the wrist is disclosed in Japanese Patent Publication No. 2005-271003. In this case, in order to stabilize the behavior of the umbilical-member during the movement of the wrist axis, the umbilical-member may be sometimes passed inside a conduit. When the umbilical-member with relatively small diameter are subjected to bending or twisting due to movement of the wrist, it can absorb the bending or twisting with no adverse effect on its useful life. However, although a conduit can absorb bending, it cannot absorb twisting adequately, and therefore, it is necessary to provide a rotatable support member on either end of the conduit.

Although it is possible to provide a rotatable support member on the outer circumference of the conduit, there is a problem that the size of the wrist and the forearm needs to be increased in order to pass the conduit therethrough. On the other hand, if the rotatable support member is provided on the distal end of the conduit, the length of the conduit is increased accordingly, and the work tool or the work tool managing device has to be moved away in the extended direction. This has a disadvantage that the load imposed on the robot is increased and the interference with the peripheral equipments is more likely to happen.

In order to prevent excessive force from being exerted to the conduit, the rotatable support member may comprise rotation mechanism on both ends thereof. However, on the side of the work tool, it may be necessary to change the attitude of the work tool in accordance with the intended work, and there is a problem that, the farther the mounting position of the work tool becomes, the narrower and the more confined the range of possible attitude of the robot in the operating region becomes. That is, when the tool tip in the work tool is fixed and only attitude is changed, the farther the tool tip from the flange of the robot becomes, the larger the angle the basic axis of the robot has to move in order to take the same attitude becomes.

SUMMARY OF THE INVENTION

It is an object of the present invention to provide an umbilical-member processing structure for an industrial robot that is capable of stabilizing the behavior of the umbilical-member disposed along the wrist and increasing the reliability of the connection of the umbilical-member even when the work tool and the wrist are moved in complex movement.

In order to attain the above object, in accordance with a first aspect of the present invention, there is provided an umbilical-member processing structure for an industrial robot comprising a forearm having a tool managing and relaying device, and a wrist with the a proximal end rotatably connected to the forearm and having a work tool mounted on a distal end of said wrist, wherein the umbilical-member connected to the work tool are disposed to run along the wrist via the tool managing and relaying device, and wherein the forearm has a first reduction gear which reduces a rotational speed of a driving source at a specified reduction ratio so as to rotationally drive the forearm and which has a first insertion hole formed therein for passing the umbilical-member, and wherein the wrist comprises a first wrist element having a through-path in communication with the first insertion hole and rotatably connected to the forearm, a second wrist element having a second insertion hole in communication with the through-path and rotatably connected to the first wrist element, and a third wrist element rotatably connected to the second wrist element, characterized in that a conduit for passing the umbilical-member from one end to the other end is provided in the first insertion hole of the forearm, in the through-path of the first wrist element, and in the second insertion hole of the second wrist element, and that, with one end of the conduit inserted in the first insertion hole so as to permit movement in an axial direction and in a direction of the outer circumference of the conduit, the other end of the conduit is held in a cantilever fashion on the second wrist element using a conduit holding member to restrict the movement of the conduit in the axial direction thereof.

With the construction as described above, since the other end of the conduit for passing the umbilical-member is held on the second wrist element in cantilever fashion, no excessive force is exerted to the conduit even when the wrist elements are operated, so that durability of the conduit is improved. The umbilical-member for the work tool is passed inside the conduit, and since diameter of umbilical-member is often small, the movement of the umbilical-member in the inner space of the conduit can absorb the bending and twisting during the operation of the wrist elements. The support structure of the conduit is simple and allows replacement of the umbilical-member in the conduit to be carried out easily. A user can freely pass a desired umbilical-member suitable for the work tool through the conduit as long as the size of the umbilical-member is smaller than the inner diameter of the conduit. Thus, the behavior of the umbilical-member in the conduit can be stabilized and the reliability of the connection of the umbilical-member can be improved.

In the umbilical-member processing structure for industrial robot as described above, it is also possible to construct it such that the conduit has a ring-shaped groove on an outer circumferential surface, and the conduit holding member has a convex portion on an inner surface to be engaged with the groove, such that, when the convex portion is engaged with the groove to hold the conduit with the conduit holding-member, the conduit is held in the cantilever fashion by the second wrist element so as to permit the rotation of the conduit in the outer circumferential direction. Engagement of the convex portion of the conduit holding member with the groove of the conduit allows the other end of the conduit to be held on the second wrist element rotatably about the rotation axis of the first wrist element, so that the conduit can be protected from the action of twist due to rotation of the first wrist element, and durability of the conduit can be thereby increased.

In the umbilical-member processing structure for industrial robot as described above, it is also possible to construct it such that the end of the conduit inserted in the first insertion hole is covered by a tubular pipe member. With such construction, it becomes possible, when bending is produced by the wrist operation, to move the conduit in reciprocating motion in the axial direction more smoothly. Sometimes, the conduit may have an innate tendency of bending for some reason related to the manufacture, or the extra length of the conduit path may be offset relative to the conduit axis, thus leading to a small twist acting on the conduit when the second wrist element is rotated. If the diameter of the umbilical-member in the conduit is large, the umbilical-member may be subjected to a twisting force when the third wrist element is rotated, and may be deformed in spiral form over the entire length of the umbilical-member. Even in such a case, since the conduit is slidingly rotated, the umbilical-member is free from any excessive force and can move smoothly.

In the umbilical-member processing structure for industrial robot as described above, it is also possible to construct it such that the conduit holding member is fixed to the second wrist element at a position offset from the rotation axis of the second wrist element. With such construction, since the conduit holding member is at a position offset from the rotation axis of the second wrist element, the conduit and the conduit holding member do not interfere with each other when the second wrist element is rotated, and the conduit can accommodate the bending due to rotation of the second wrist element in an ample space opened in an vertical direction.

BRIEF DESCRIPTION OF THE DRAWINGS

The above and other objects, features and advantages of the present invention will become more apparent from the following description of the preferred embodiments with reference to appended drawings, in which:

FIG. 14 is a view of the internal structure of the first wrist element and another example of the conduit holding member;

DETAILED DESCRIPTION

The present invention will be described in detail with reference to drawings.

Figure 1:
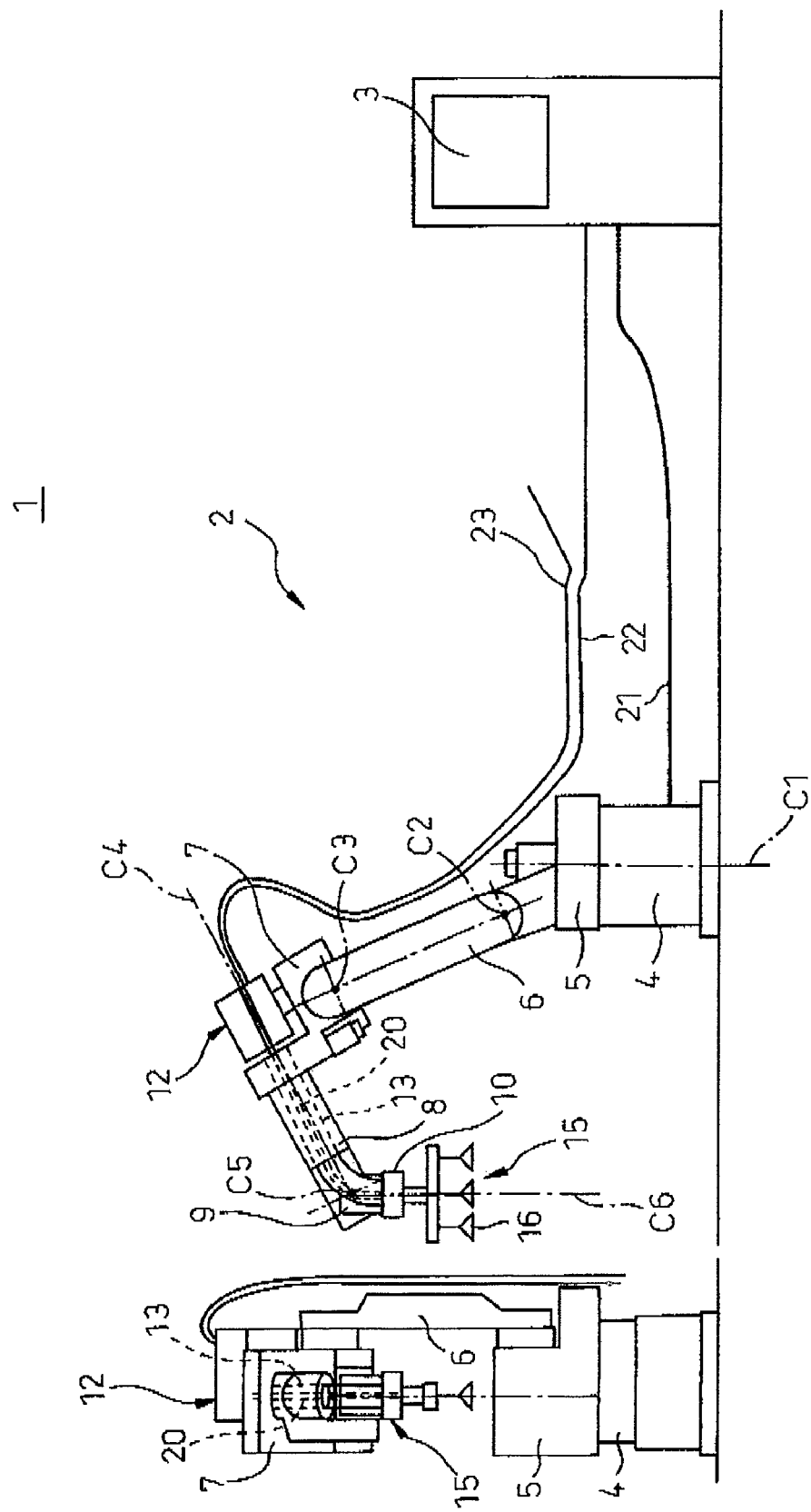
FIG. 1A is a front view of a robot system to which an umbilical-member processing structure according to a first embodiment of the present invention is applied.
FIG. 1B is a side view of the robot system of FIG. 1A.
Figure 2:
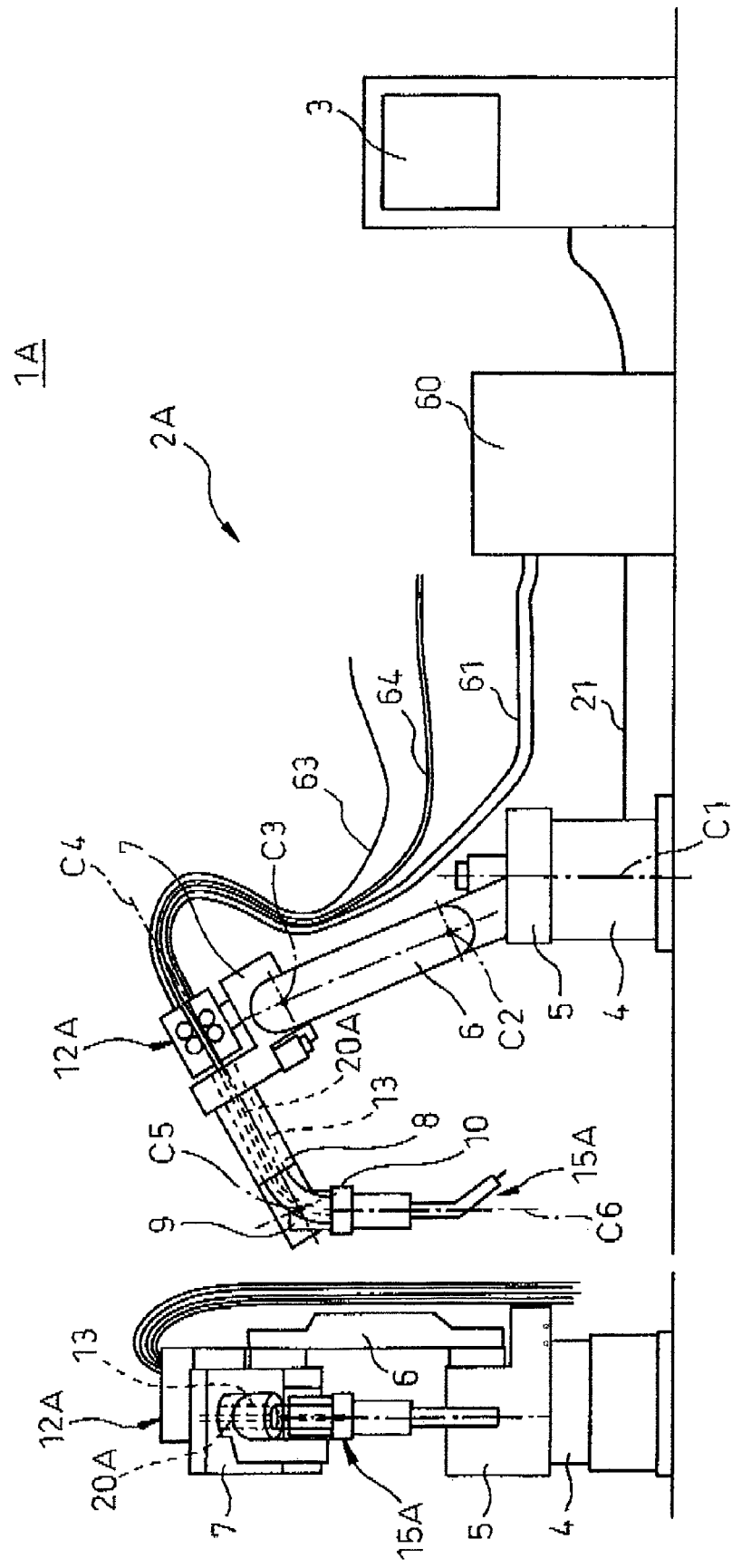
FIG. 2A is a front view of a robot system to which an umbilical-member processing structure according to a second embodiment of the present invention is applied.
FIG. 2B is a side view of the robot system of FIG. 2A.

FIGS. 1A, B are views of a handling robot system having a work tool. An umbilical-member (hand cable) connected to the work tool (hand) is passed inside a forearm and first to third wrist elements. FIGS. 2A, B are views of an arc welding robot system as another example of an umbilical-member (torch cable) connected to a work tool (welding torch) being passed inside a forearm and first to third wrist elements.

Robot 2 shown in FIGS. 1A, B is a handling robot of six-axes of freedom comprising swivel trunk 5 rotated about a first rotation axis on base 4 of a robot body, upper arm 6 connected rotatably about a second rotation axis to an upper portion of swivel trunk 5, forearm 7 rotatably connected about a third rotation axis to a distal end of upper arm 6, and a wrist having three axes of freedom. The wrist consists of a first-third wrist elements 8-10. Robot 2 is controlled in accordance with command from robot controller 3 such that servo motors mounted on drive sections of six axes (junctions) are controlled via control cables so as to move hand 15 mounted on the distal end of the wrist to the position of the parts to be handled in designated attitude to the point of destination.

Robot controller 3 outputs an operating command to the servo motors, and at the same time, outputs air supply and confirmation signal to electromagnetic valve box (tool managing and relaying device) 12 and to hand 15. Hand 15 can thereby attract a work piece by suction in accordance with specified operating sequences.

Electromagnetic valve box 12 mounted on the rear portion of fore arm 7 has an unshown electromagnetic valve and a vacuum generating apparatus. When a work piece is to be attracted by suction pad 16 of hand 15, suction pad 16 is brought into close contact with the work piece and is then evacuated in the inside to attract the work piece. Hand cable 20 for supplying air and signal to hand 15 is passed through the inside of forearm 7 (first insertion hole 33) and the inside of second wrist element 9 (second insertion hole 39) and is then directed to hand 15 on the distal end of the wrist.

In electromagnetic valve box 12, hand control cable 22 from robot controller 3 and air pipeline 23 from an unshown air supply source are connected to the electromagnetic valve and the vacuum generating apparatus in the electromagnetic valve box. Hand control cable 22 comprises a power line for driving the electromagnetic valve, a signal line for checking the state of the electromagnetic valve and the vacuum of the suction pad, and the like. Air pipeline 23 is connected to the electromagnetic valve. The electromagnetic valve and the vacuum generating apparatus are also connected to the air pipeline and the like. Hand control cable 22 and air pipeline 23 may be bundled with robot motor control cable 21 in upper arm 6 of robot 2 to be led through the inside of upper arm 6, or they may be led as shown in the drawing from the outside of upper arm 6 separately from robot motor control cable 21.

When hand control cable 22 and air pipeline 23 are to be passed through the inside of upper arm 6, hand control cable 22 and air pipeline 23 are drawn into the inside of upper arm 6 via a connector or coupling in the switchboard of base 4 of the robot body. Hand control cable 22 and air pipeline 23 are bundled together with motor control cable 21, and the bundle is passed through the hollow portion concentric to first rotation axis C1 of swivel trunk 5, and is drawn out to the upper portion of swivel trunk 5. Drawn-out cables 21-23 are directed from the lower side of upper arm 6 along the longitudinal direction of upper arm 6 to the upper side of upper arm 6, and are connected to electromagnetic valve box 12 mounted on fore arm 7. Motor control cable 21 for driving the first-third wrist elements 8-10 is directed together with hand control cable 22 and air pipeline 23 through the inside of base 4 of the robot body, the inside of swivel trunk 5 and along the side of upper arm 6 to the front surface of forearm 7.

FIGS. 2A, 2B are views showing arc welding robot system 1A as another example of the robot system. A tool managing and relaying device is wire supplying device 12A, and the work tool is torch 15A, in this example. Torch cable (umbilical-member) 20A consisting of a power cable for supplying power to welding torch 15A, a gas pipeline for supplying assist gas, a wire liner supplying a welding wire, and the like, is disposed to run between welding torch 15A and wire supplying device 12A. Welding power cable 61 directed from welding power supply 60, control cable 62 for controlling the wire supplying device directed from the robot controller, gas hose 63 directed from a primary gas source, and wire conduit 64 directed from a welding wire drum or reel, are respectively connected to wire supplying device 12A.

Robot controller 3 is connected to welding power supply 60 via a communication line, and controls welding power supply 60 in synchronism with the operation of robot 2A, such that, when robot 2A is moved to the starting point of the arc welding operation, welding torch 15A is controlled to carry out welding under predetermined welding conditions. As in FIGS. 1A, B, cables 61-64 connected to wire supplying device 12A may be disposed to pass through the inside of base 4 of the robot body, the inside of swivel trunk 5 and the inside of upper arm 6, or as shown in the drawing, may be disposed on the outside of upper arm 6. Even when the above cables 61-64 are to be disposed through the inside of upper arm 6, it is desirable that wire conduit 64 be processed outside upper arm 6, since adequate bending radius for the welding wire cannot be provided.

Figure 3:
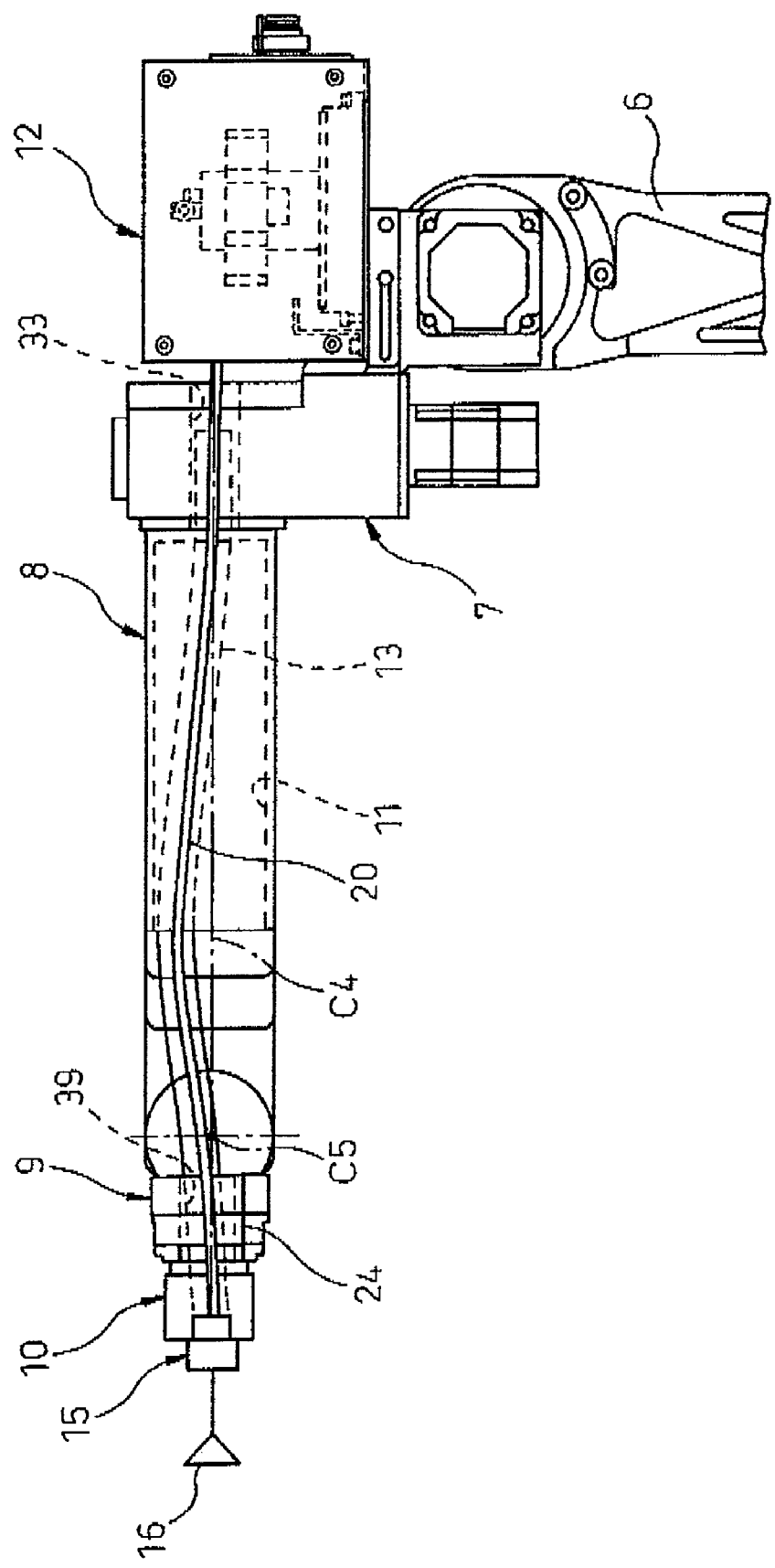
FIG. 3 is a front view of an umbilical-member disposed to run between a hand of a handling robot shown in FIG. 1 and an electromagnetic valve box.
Figure 4:
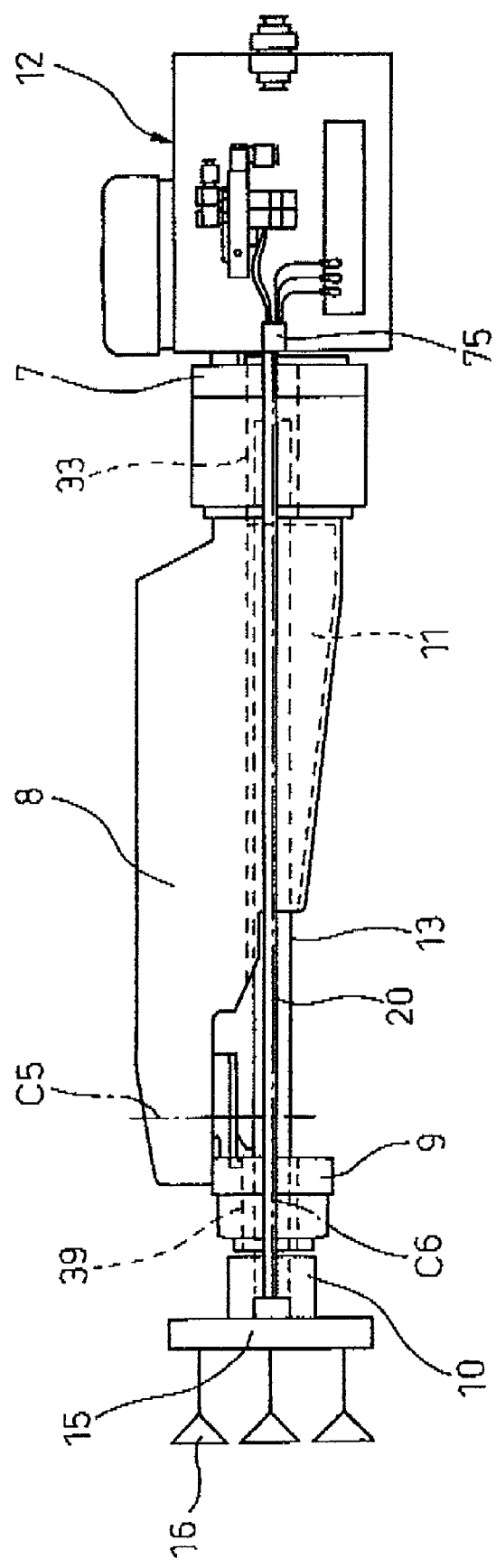
FIG. 4 is a plan view of the same umbilical-member disposed to run between a hand of a handling robot shown in FIG. 1 and an electromagnetic valve box.

FIGS. 3 and 4 are views of the processing structure according to the present invention for processing hand cable 20 connected to hand 15 as a work tool. Although the example of handling robot 2 shown in FIGS. 1A, B is shown, the example of arc welding robot 2A may be used likewise. Hand cable 20 between hand 15 and electromagnetic valve box 12 is passed through flexible conduit 13 shown in FIG. 5. Conduit 13 is held on second wrist element 9 in cantilever fashion with one end inserted into forearm 7.

Figure 5:
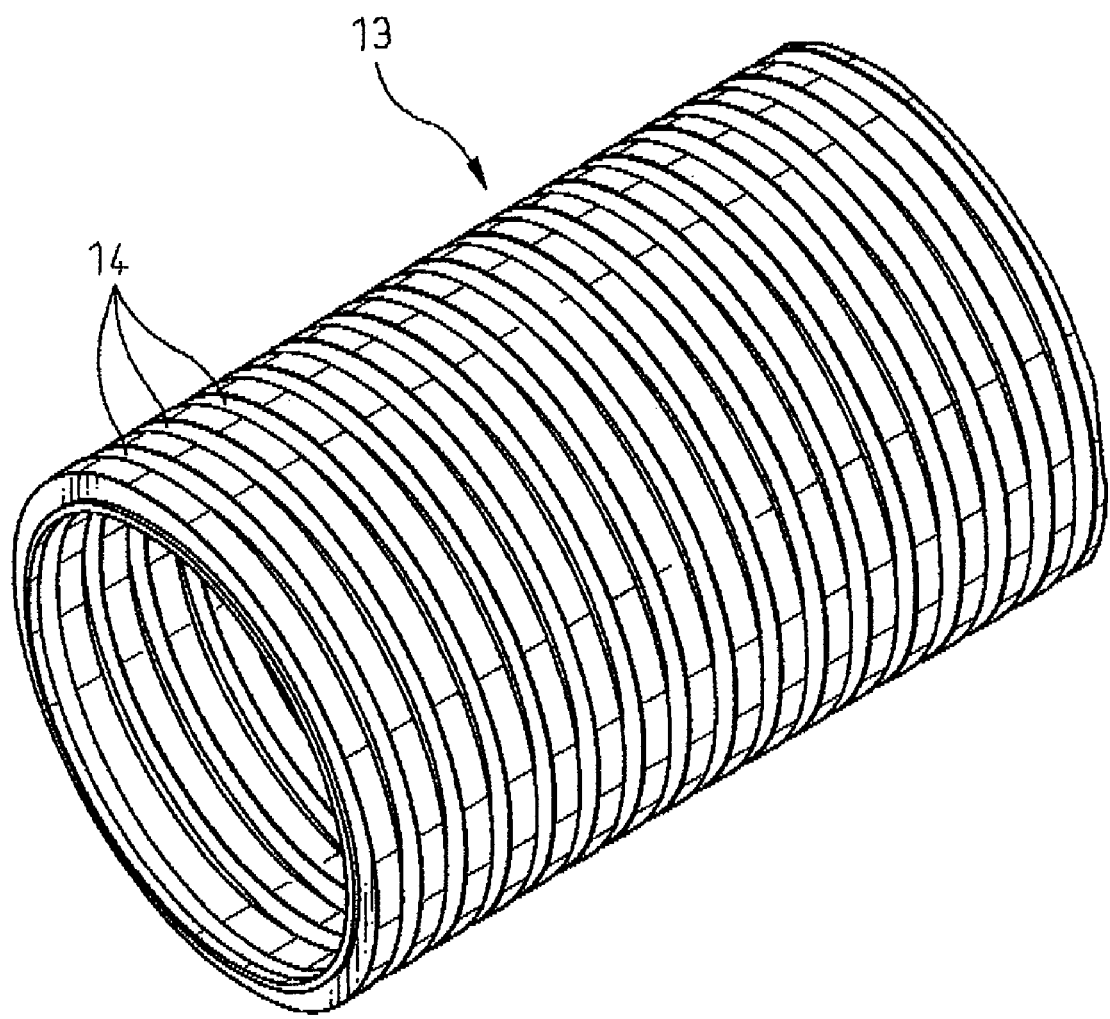
FIG. 5 is a perspective view of a conduit for passing an umbilical-member therethrough.

As shown in FIG. 5, conduit 13 is a flexible pipe-shaped member formed from resin. Outer circumferential surface of conduit 13 has a wavy shape with a multiplicity of ring grooves 14 formed at a specified pitch. Thus, the shape of conduit 13 is formed such that it has increased durability in respect of bending and twisting. An umbilical-member such as hand cable 20 or torch cable 20A is inserted into conduit 13 from one end toward the other end, such that the movable portion of cable 20, 20A moved in association with the rotation of wrist elements 8-10 can be protected by conduit 13.

One end of conduit 13 as a free end is inserted slidably and rotatably into pipe 17 within forearm 7. Pipe 17 is integrally provided in a first reduction gear (first insertion hole 33) which reduces the rotational speed of a motor in a predetermined reduction ratio to drive first wrist element 8 in rotation. Thus, one end of conduit 13 can be moved in the outer circumferential direction and in the axial direction.

Figure 6:
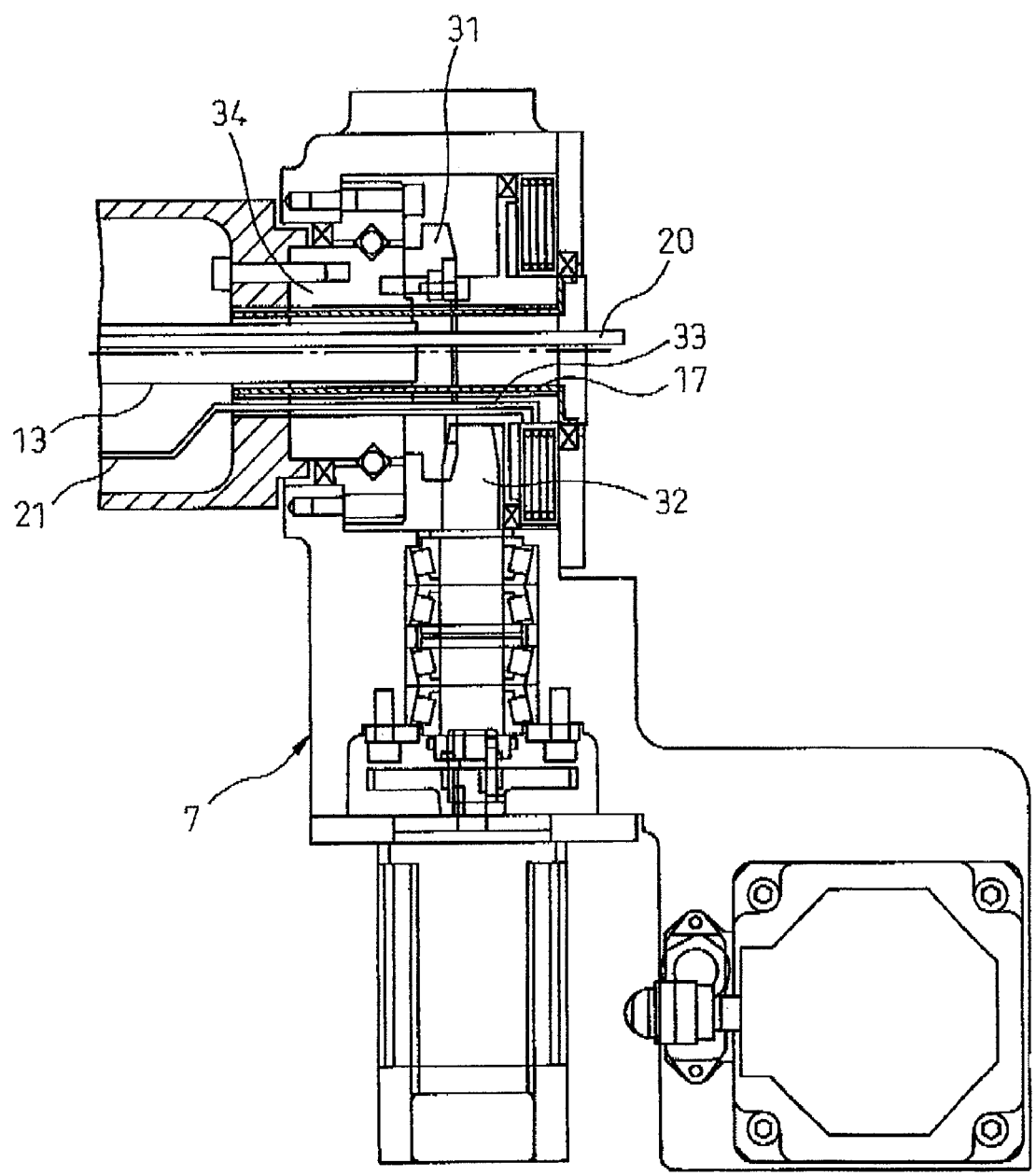
FIG. 6 is a front view of the internal structure of the forearm.
Figure 7:
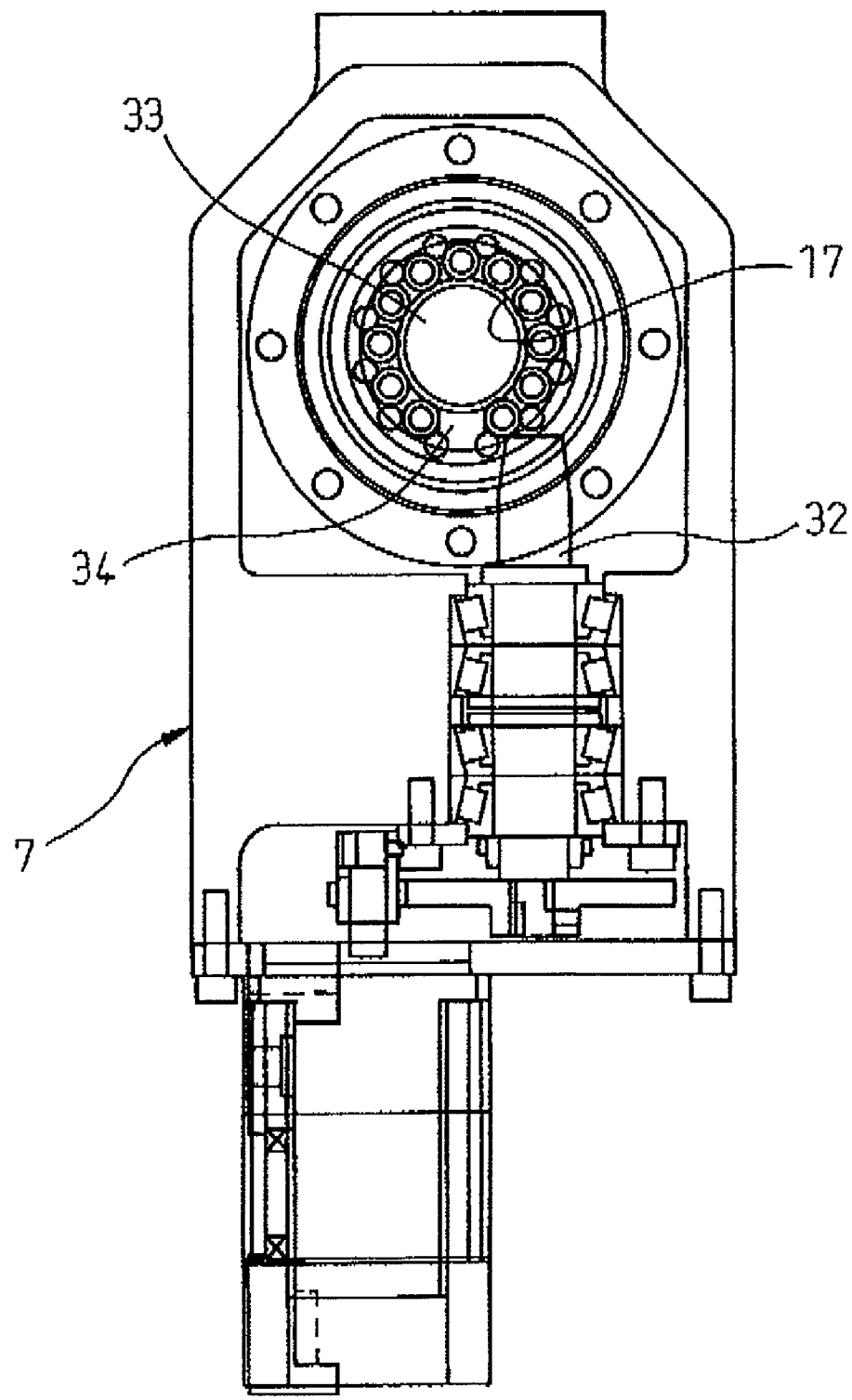
FIG. 7 is a side view of the same internal structure of the forearm.

FIG. 6 is a view showing pipe 17 integrally provided as one unit in the first reduction gear. FIG. 7 also shows the interior of first reduction gear having pipe 17 inserted therein. Since pipe 17 is formed of a material with high slidability, conduit 13 can be passed therein reliably. Thus, when wrist elements 8-10 are rotated, conduit 13 can move freely and can thereby absorb the bending or twisting of conduit 13. Second wrist element 9 is rotated about fifth rotation axis C6, and when conduit 13 is subjected to bending, conduit 13 slides forward in pipe 17 of forearm 7. Since conduit 13 has been inserted into pipe 17 to a sufficient depth, conduit 13 does not come out from pipe 17. Since the inner wall of pipe 17 has high slidability relative to conduit 13, conduit 13 can be smoothly moved in reciprocating motion, and no excessive force is exerted to conduit 13.

On the other hand, the other end of conduit 13 as a constrained end is held by second wrist element 9 using conduit holding member 24. Here, there are two methods for holding conduit 13. In one method, conduit 13 is held such that the rotation of conduit 13 in the direction of the outer circumference is permitted while the displacement of conduit 13 in the axial direction is restricted. In the other method, conduit 13 is held such that both rotation and axial displacement of conduit 13 are restricted. Hereinafter, the former method for holding the conduit will be referred to as rotation permissive holding method and the latter method for holding the conduit will be referred to as complete fixation holding method.

Figure 10:
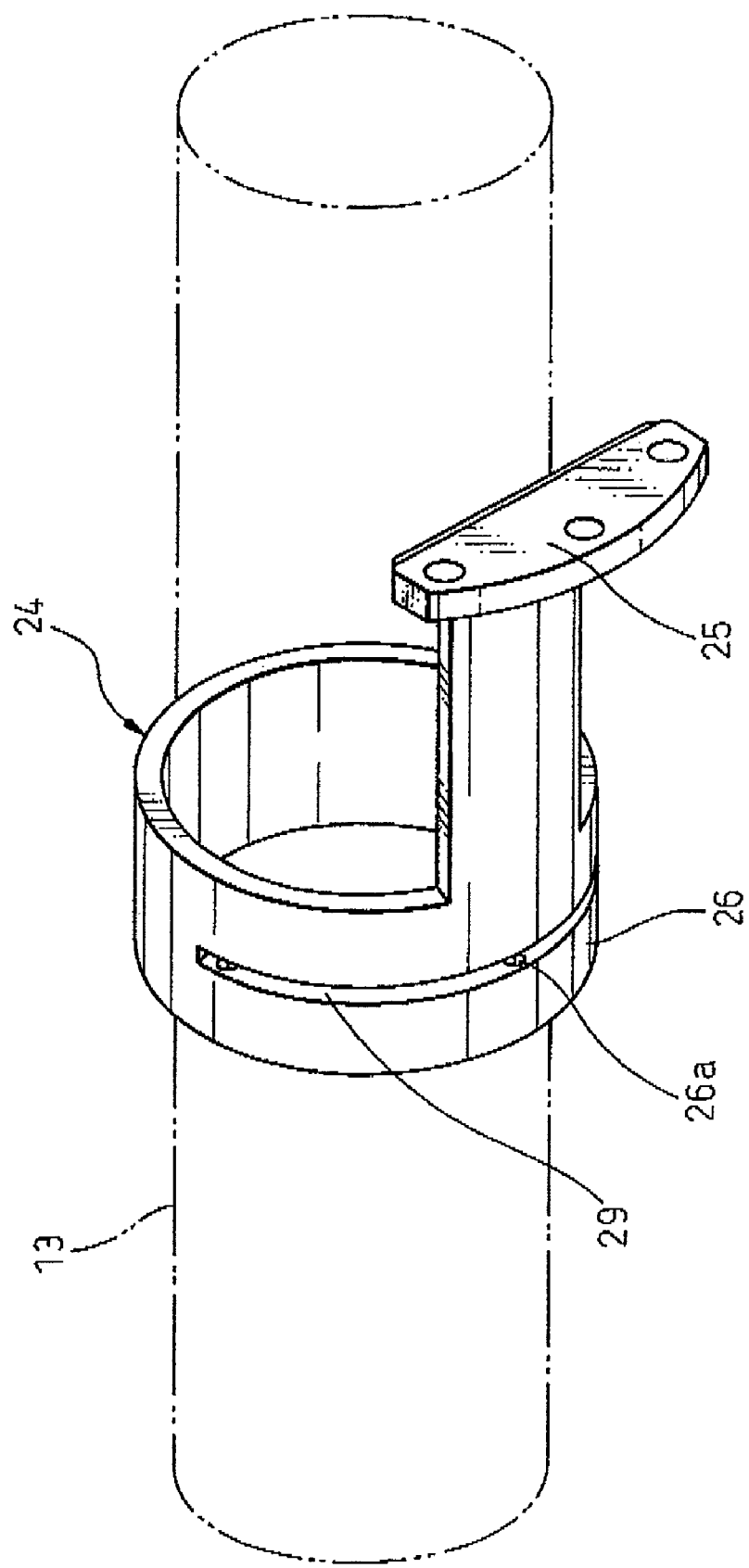
FIG. 10 is a perspective view of a conduit holding member shown in FIG. 8.

In both rotation permissive holding method and complete fixation holding method, conduit holding member 24 comprises fixed bracket (fixation section) 25 fixed to second wrist element 9 and grasping section 26 connected to fixation section 25 for grasping conduit 13 (FIG. 10). Conduit holding member 24 will be described in detail later. Conduit holding member 24 is not limited to the present embodiment, but can be implemented in various modifications. A resilient cylinder member or a nylon band may be used to hold the conduit. When conduit 13 is held in complete fixation without permitting sliding or rotation, a simple holding structure can be applied. However, since conduit 13 is provided along wrist elements 8, 9 (in the wrist elements) moved in complex movement, it is necessary to hold the conduit such that regular replacement can be carried out easily. Thus, it is desirable that conduit 13 be held in a simple detachable holding structure.

When the other end of conduit 13 is held in complete fixation on second wrist element 9, upon rotation of first wrist element 8, conduit 13 is rotated integrally with first wrist element 8 as one unit. Upon rotation of third wrist element 10, hand cable 20 in conduit 13 is rotated with the third wrist element so that a twisting force acts on hand cable 20, but not on conduit 13. However, if conduit 13 has a tendency for bending, or if the diameter of hand cable 20 in conduit 13 is large, conduit 13 is slightly rotated in sliding motion. No excessive force is exerted to hand cable 20 and conduit 13 by the slight rotation in sliding motion, and thus, a smooth processing is possible.

Hand cable 20 in conduit 13 is composed of signal cables and an air pipeline, respective diameters of which are small as compared to the outer diameter of conduit 13. Therefore, by providing an extra length of the cables and pipeline in conduit 13, bending and twisting produced at the time of the wrist operation can be easily absorbed. These cables and pipeline are of small diameter, and therefore, their behavior cannot be stabilized in themselves. But, since they are covered by conduit 13, they can be processed in stable behavior at the time of rotation of wrist elements 8-10. One end of hand cable 20 is connected to electromagnetic valve box 12, and the other end of hand cable 20 is passed within second wrist element 9 through the inside (second insertion hole 39) of a second reduction gear that drives third wrist element 10 in rotation at a specified speed reduction ratio, and then signal cables are connected to proximity switch and the like in the hand, and the air pipeline is connected to the rear portion of suction pad 16.

FIGS. 6 and 7 are views showing the structure of forearm 7. A pipe 17 is integrally provided as a protection member for protecting one end of conduit 13 in first insertion hole 34 in a first reduction gear consisting of a gear set of hypoid pinion 32 and hypoid gear 31 and bearing 34. In the rear portion of forearm 7, as shown in FIGS. 3 and 4, electromagnetic valve box 12 is disposed in the rear space of forearm 7 in the vicinity of forearm 7. With such construction, inertia of wrist elements 8-10 at the time of rotation can be decreased, and the load imposed on robot 2 can be reduced. Interference of the electromagnetic valve box with peripheral equipments can also be prevented.

Motor control cable 21 mounted on second wrist element 9 or third wrist element 10 is processed in a space separated from hand cable 20 in order to secure the reliability of the moving portion (sliding portion) of cable 21. Processing of the reduction gear and the moving portion of the cable can minimize the length in the direction of the fourth axis without influencing the arrangement of motors. With such construction, interference of hand cable 20 with motor control cable 21 can be eliminated and the reliability of the moving portion of motor control cable 21 can be secured.

Figure 8:
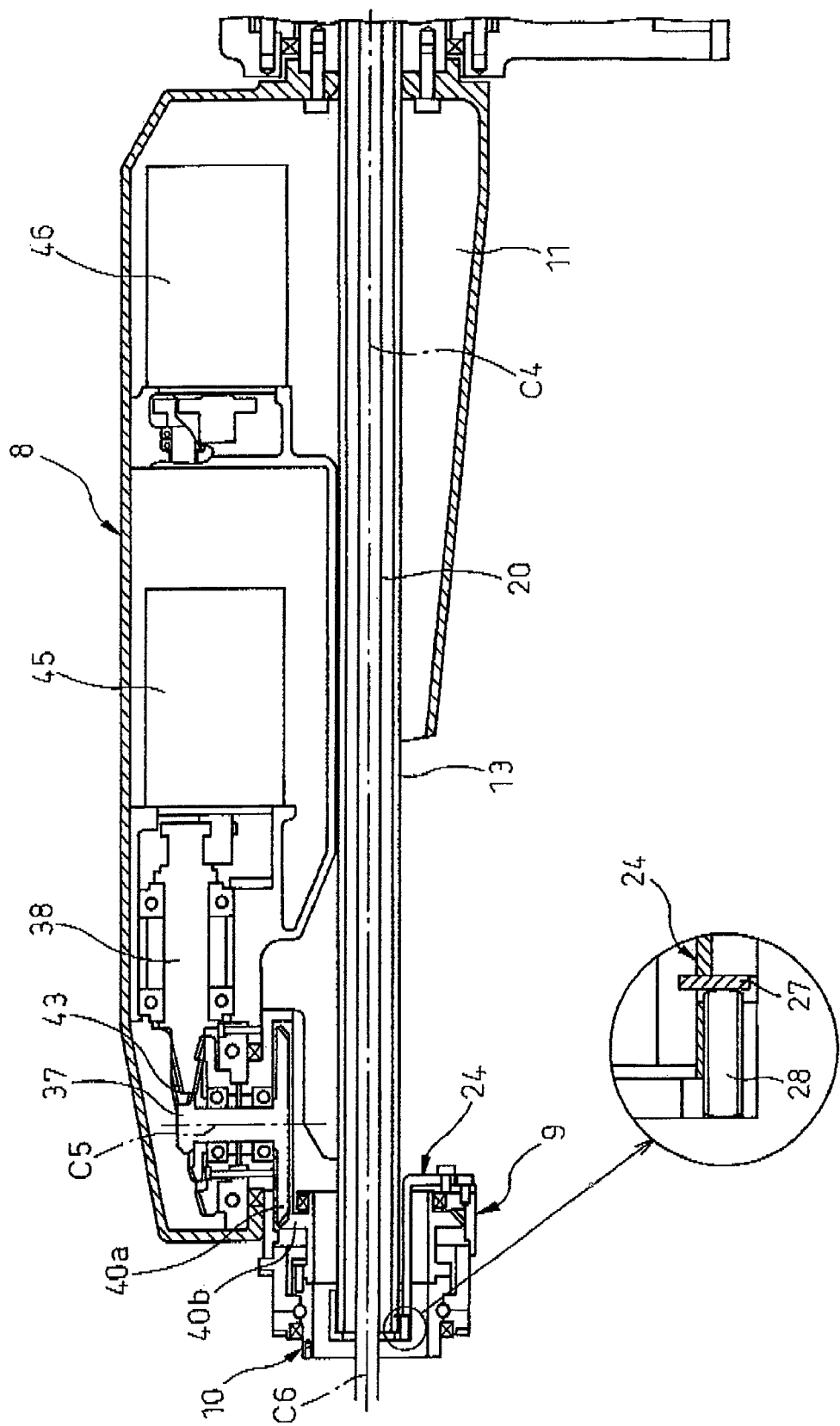
FIG. 8 is a view of the internal structure of the first wrist element and a conduit holding member holding the other end of the conduit in cantilever fashion at the second wrist element.
Figure 9:
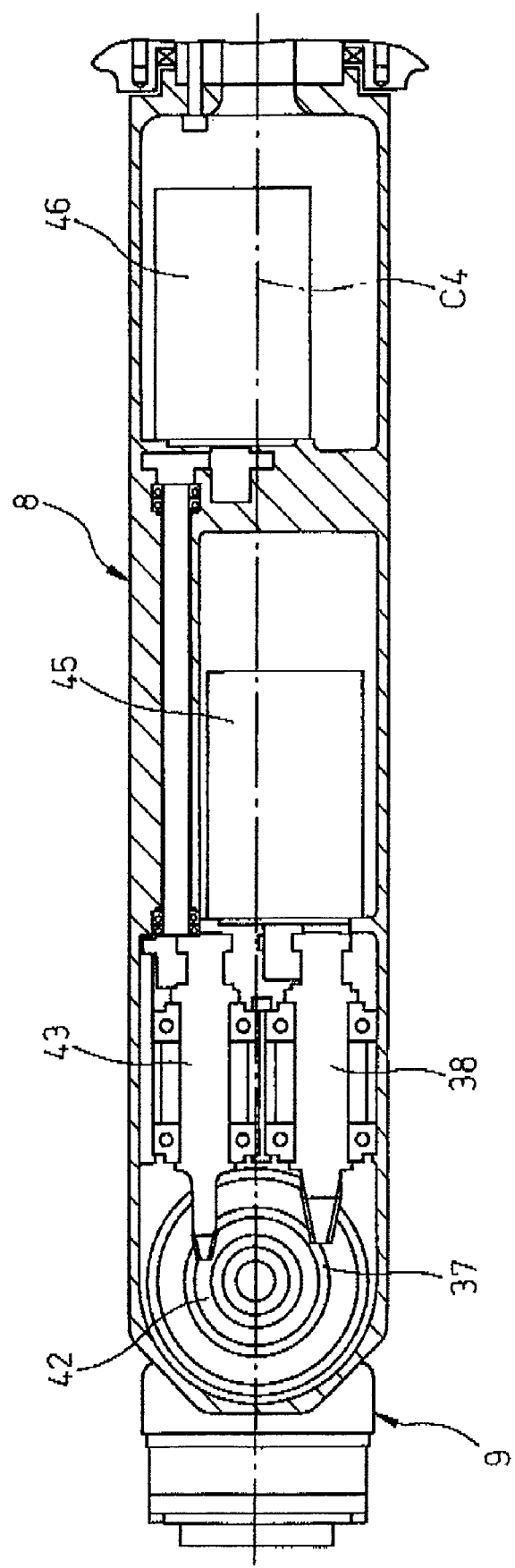
FIG. 9 is a view of the same internal structure of the first wrist element.

Next, the internal structure of the first-third wrist elements 8-10 and conduit holding member 24 for holding conduit 13 will be described with reference to FIGS. 8-10. As shown in FIGS. 8 and 9, a pair of motors 45, 46 for driving second and third wrist elements 9, 10 are mounted on first wrist element 8 at positions offset relative to fourth rotation axis C4 longitudinally (in the direction of the fourth rotation axis) in line with each other. Rotation axis of each of motors 45, 46 is connected to a reduction gear having a pair of gear set 37, 38, 42, 43 for reducing the rotational speed of the motor at a specified reduction ratio. Gear set 37, 38 mesh with a set of bevel gears 40a, 40b. Thus, second wrist element 9 can be rotated about fifth rotation axis C5 orthogonal to fourth rotation axis C4, and third wrist element 10 can be rotated about sixth rotation axis C6 orthogonal to fifth rotation axis C5. In the embodiment shown, the attitude of the robot is such that rotation axis C4 of first wrist element 8 is coaxial with rotation axis C6 of third wrist element 10, and conduit 13 for passing hand cable 20 is in the shape of a straight line.

Conduit 13 that is passed through first insertion hole 33 in forearm 6, through-path 11 of first wrist element 8, and second insertion hole 39 in second wrist element 9, is held at one end in cantilever fashion by conduit holding member 24 fixed to second wrist element 9, and hand cable 20 is passed in conduit 13 from one end to the other end. Conduit holding member 24 shown in FIG. 10 holds conduit 13 by a rotation permissive holding method, and is composed of fixation section 25 fixed to second wrist element 9 by means of a fastening member, tubular grasping section 26 for grasping conduit 13, C-ring 27, and fastening screw 28 for fixing the C-ring 27. Grasping section 26 has thin groove 29 formed penetratingly in the direction of outer circumference in the shape of slit for inserting C-ring 27. Thin groove 29 has screw hole 26a formed on the groove wall for threaded engagement with fastening screw 28 to fix C-ring 27 in thin slit 29. C-ring 27 inserted into thin groove 29 of grasping section 26 is inserted such that the inner edge portion projects from the inner wall of grasping section 26 inward to the position adapted for engagement with ring groove 14 of conduit 13 grasped by grasping section 26.

With such construction, conduit 13 inserted into grasping section 26 is seized by C-ring 27 inside grasping section 26. Thus, conduit 13 is restricted in displacement in the axial direction while rotation in the direction of outer circumference is permitted, so that conduit 13 is protected from the action of twisting due to rotation of first wrist element 8. When conduit 13 is to be removed from grasping section 26, fastening screw 28 is loosened. Then, conduit 13 can be easily removed from grasping section 26. In this case, hand cable 20 in conduit 13 needs to be disconnected from hand 15 and electromagnetic valve box 12 beforehand.

Conduit holding member 24 is fixed to second wrist element 9 at a position offset relative to fifth rotation axis C5 of second wrist element 9. Therefore, at the time of the operation of second wrist element 9, only the tubular portion of grasping section 26 of conduit holding member 24 may come into contact with conduit 13, but the contact of fixation section 25 can be prevented. Since the second and third reduction gear of second wrist element 9 and third wrist element 10 and motors 45, 46 are located at positions offset relative to conduit 13, and therefore, do not obstruct the movement of conduit 13. At the inlet port of second insertion hole 39 of second wrist element 9, the shape of the conduit holding member is contrived such that, even if conduit 13 may come into contact with the tubular portion of grasping section 26, it never strikes the edge of conduit holding member 24.

Figure 11:
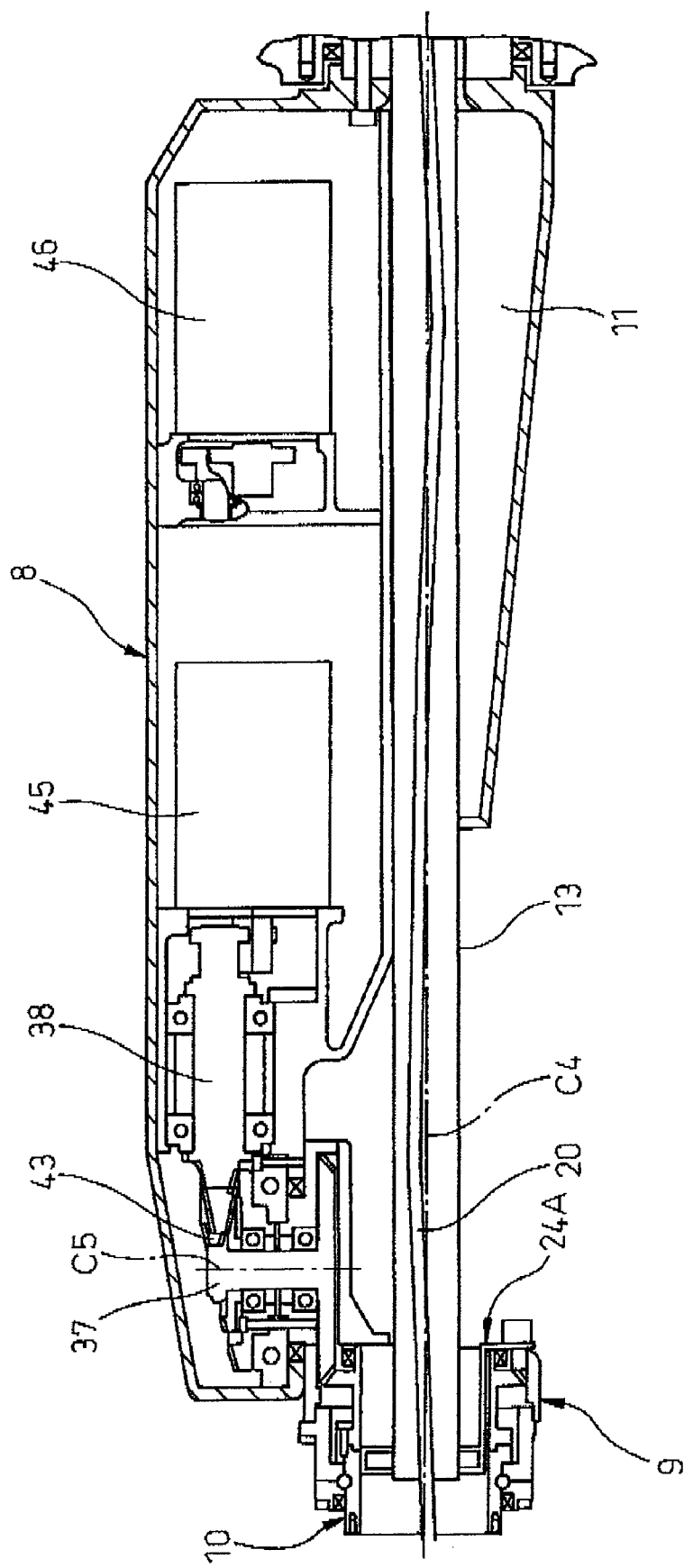
FIG. 11 is a view of the internal structure of the first wrist element and another example of the conduit holding member.
Figure 12:
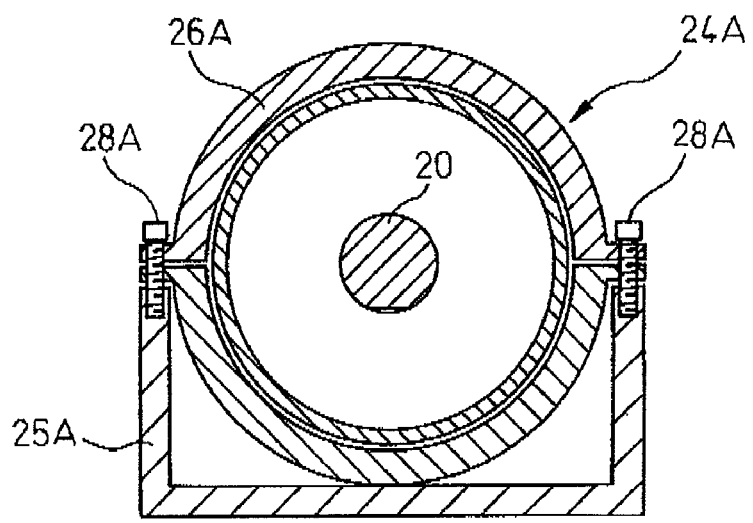
FIG. 12 is a sectional view of the conduit holding member of FIG. 11.
Figure 13:
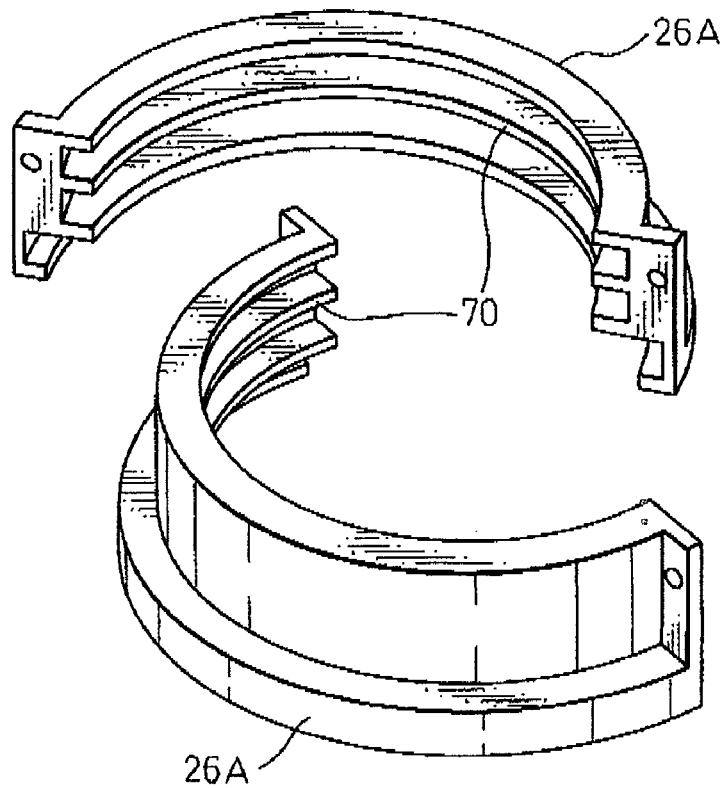
FIG. 13 is a perspective view of a pair of halved grasping section shown in FIG. 11.

FIGS. 11-13 are views of variations of the conduit holding member. As in the case of conduit holding member 24 of FIG. 10, conduit 13 is held by conduit holding member 24A in a rotation permissive holding method. Conduit holding member 24A includes fixation bracket 25A fixed to second wrist element 9, and a pair of grasping members 26A, 26A in the shape of two halved rings. This embodiment differs from conduit holding member 24 shown in FIG. 8 in that fixation bracket 25A and a pair of grasping members 26A, 26A in the shape of two halved rings are separate members. As shown in FIG. 12, fixation bracket 25A has the shape of inverted "C", and grasping section 26A is adapted to be fastened to fixation bracket 25A by means of screw 28A.

As shown in FIG. 13, convex portion 70 is provided on the inner circumferential surface of grasping section 26A for engagement with ring shaped groove 14 of conduit 13. With conduit 13 being grasped by a pair of grasping sections 26A, 26A, upon engagement of convex portion 70 of grasping section 26A with ring shaped groove 14 of conduit 13, movement of conduit 13 in the axial direction is restricted while the rotation of conduit 13 in the direction of the outer circumference is permitted. Method of fixing a pair of grasping sections 26A, 26A in one unit, or method of fixing fixation bracket 25A to second wrist element 9, is not restricted to the embodiments shown. As a simple method, a fastening member such as a screw may be used for fixation. As in the case shown in FIGS. 10 and 11, conduit holding member 24A is fixed to second wrist element 9 at a position offset relative to fifth rotation axis C5.

In another method, it is possible to mount a resilient ring on conduit grasping section 26A, and there is interference relative to the outer diameter of conduit 13 so that conduit 13 can be fixed in pressed-in state. Since conduit 13 has been pressed in, conduit 13 moves in one unit with conduit holding member 24A when wrist elements 8-10 are operated. Since conduit 13 is formed in wavy shape, it bites into the resilient ring and is thereby securely held by the ring. When conduit 13 is to be removed, conduit 13 needs only to be pulled out and thus can be easily detached. In practice, the replacement operation often includes replacement of the umbilical-member contained therein. In this case, hand cable 20 connected to hand 15 and electromagnetic valve box 12 is removed before replacement.

FIG. 14 is a view showing another variation of the conduit holding member. Conduit holding method according to this variation is a complete fixation holding method in which both rotation and axial displacement of conduit 13 are restricted. Conduit 13 is fixed by two sets of grasping rings 26B, 26B that bite into conduit 13 on the outer circumferential surface. Conduit holding member 24B is composed of hold-down plate 25B as a fixation section fixed to second wrist element 9, and two sets of grasping rings (grasping section) 26B, 26B that contract upon application of force in the radially inward direction by hold-down plate 25B. Conduit 13 is held by two sets of grasping rings 26B, 26B that grasp conduit 13 at the position of ring shaped groove 14 of conduit 13. Conduit 13 is thereby fixed to second wrist element 9. Grasping rings 26B, 268 have protruding distal ends formed of resilient body with an interference in the radial direction of conduit 13, so as to move together with hold-down plate 25B as one body. By providing small gap, when second wrist element 9 is rotated, conduit 13 can tilt relative to second wrist element 9 (hold-down plate 25B) and bending force acting upon conduit 13 can be thereby reduced. By imparting a form with suitable R to the inner circumference portion of hold-down plate 25B, friction can be reduce and the anomalous wear of conduit 13 can be avoided. By using two halved structure for hold-down plate 25B, detachment of conduit 13 can be accomplished simply by removing the screws or the like that fasten the two halves. Of course, also in this case, hand cable 20 in conduit 13 has to be disconnected from hand 15 and electromagnetic valve 12 beforehand.

Figure 15A:
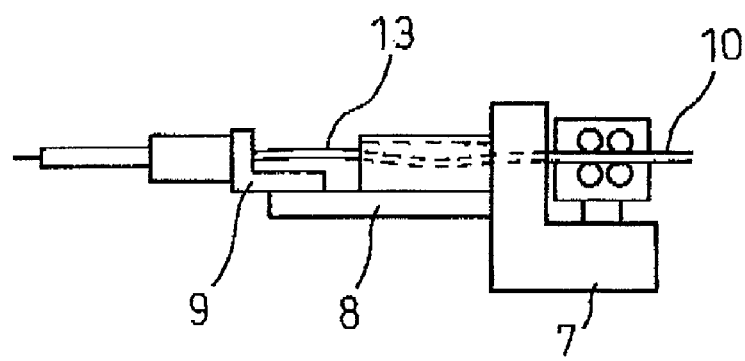
FIG. 15A is a view of the behavior of the conduit when the first wrist element according to the present invention is rotated clockwise by 90 degrees from the basic attitude.
Figure 15B:
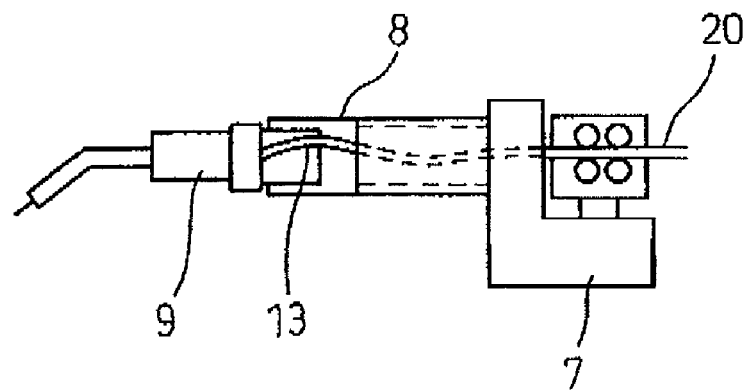
FIG. 15B is a view of the basic attitude of the same first wrist element according to the present invention.
Figure 15C:
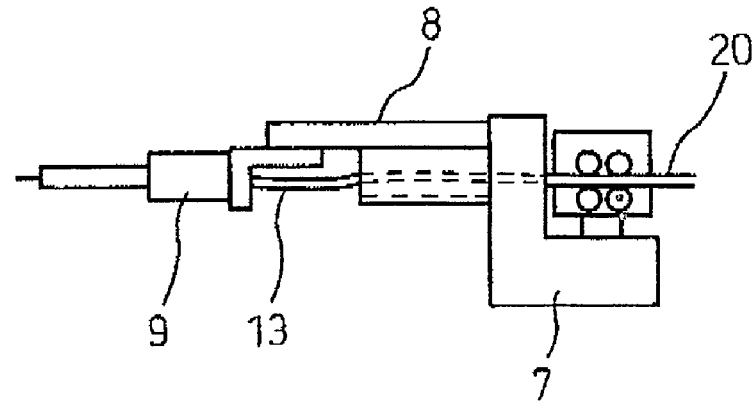
FIG. 15C is a view of the attitude of the first wrist element according to the present invention when rotated anticlockwise by 90 degrees from the basic attitude.

FIG. 15A, B, C are views showing the behavior of conduit 13 at the time of rotation of first wrist element 8. In FIG. 15B, the basic attitude of first wrist element 8 is shown. FIG. 15A shows the attitude of first wrist element 8 when rotated clockwise by 90 degrees from the basic attitude of FIG. 15B. FIG. 15C shows the attitude of first wrist element 8 when rotated anticlockwise by 90 degrees from the basic attitude of FIG. 15B. Since conduit 13 is held in complete fixation to second wrist element 9, when first wrist element 8 is rotated, conduit 13 is rotated together with first wrist element 8. One end of conduit 13 is inserted into pipe 17 of forearm 7, pipe 17 is also rotated in one unit with conduit 13. However, if conduit 13 has a tendency for bending or if the path of the extra length of conduit 13 is offset relative to fourth rotation axis C4, conduit 13 may be slidingly rotated slightly when second wrist element 9 is rotated. Also, if the line diameter of hand cable 20 in conduit 13 is large, hand cable 20 may be subjected to twisting force and deformed in spiral shape by the rotation of second wrist element 9, so that twisting force may act on conduit 13. With the structure as described above, conduit 13 is supported in pipe 17 so as to permit sliding rotation, and therefore, can be rotated smoothly. Hand cable 20 in conduit 13 is fixed to hand 15, and the twist produced at the time of rotation of first wrist element 8 is absorbed by individual signal lines and air pipeline. Also at the time of rotation of third wrist element 10, processing can be performed as described above. When conduit 13 is not fixed in the direction of outer circumference in second insertion hole 39 of second wrist element 9, the conduit is slidingly rotated to thereby improve durability with respect to twisting.

Figure 16A:
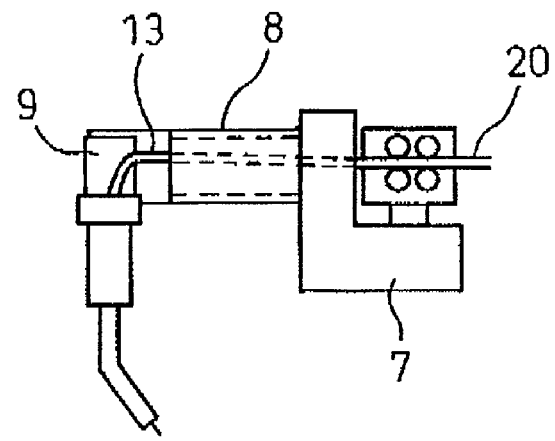
FIG. 16A is a view of the attitude of the second wrist element according to the present invention when rotated anticlockwise by 90 degrees from the basic attitude.
Figure 16B:
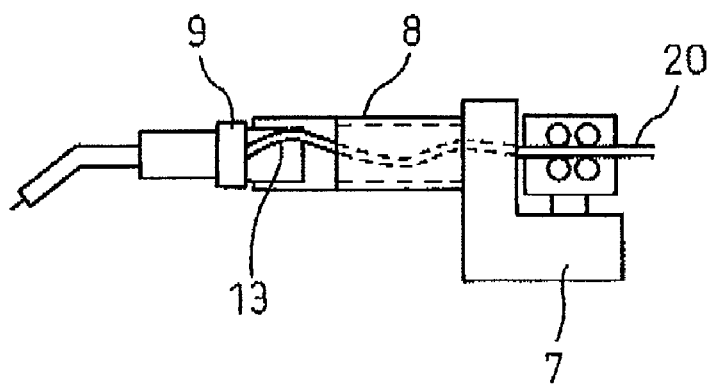
FIG. 16B is a view of the basic attitude of the same second wrist element according to the present invention.
Figure 16C:
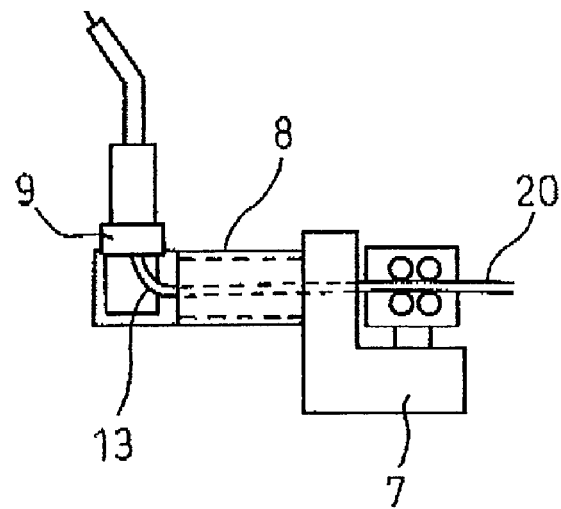
FIG. 16C is a view of the attitude of the same second wrist element according to the present invention when rotated clockwise by 90 degrees from the basic attitude.

FIGS. 16A, B, C are views showing the behavior of conduit 13 at the time of rotation of second wrist element 9. In FIG. 16B, the basic attitude of second wrist element 9 is shown. FIG. 16A shows the attitude of second wrist element 9 when rotated anticlockwise by 90 degrees about fifth rotation axis C5 from the basic attitude of FIG. 16B. FIG. 16C shows the attitude of first wrist element 8 when rotated clockwise by 90 degrees from the basic attitude of FIG. 16B. At the time of rotation of second wrist element 9, bending force is produced on conduit 13. If conduit 13 is held in complete fixation in second insertion hole 39 of second wrist element 39, conduit 13 slides in first insertion hole 33 of forearm 6. Since conduit 13 is inserted in pipe 17 in first insertion hole 33, and has an extra length in through-path 11 of first wrist element 8, it can be rotated smoothly when subjected to bending due to rotation of second wrist element 9. Thus, through-path 11 has adequate space to process the bending of conduit 13 so as to exceed a permissible value. Even if conduit 13 is bent in accordance with the movement of second wrist element 9, it is possible to process the conduit with an adequate bending radius. Although the length of conduit 13 between first insertion hole 33 and second insertion hole 39 is increased by bending, this can be absorbed by the extra length in through-path 11 and the extra length inserted in pipe 17. Hand cable 20 in conduit 13 is fixed to hand 15, and the twisting of conduit 13 produced by the rotation of first wrist element 8 can be absorbed by individual signal lines and the air pipeline.

Figure 17:
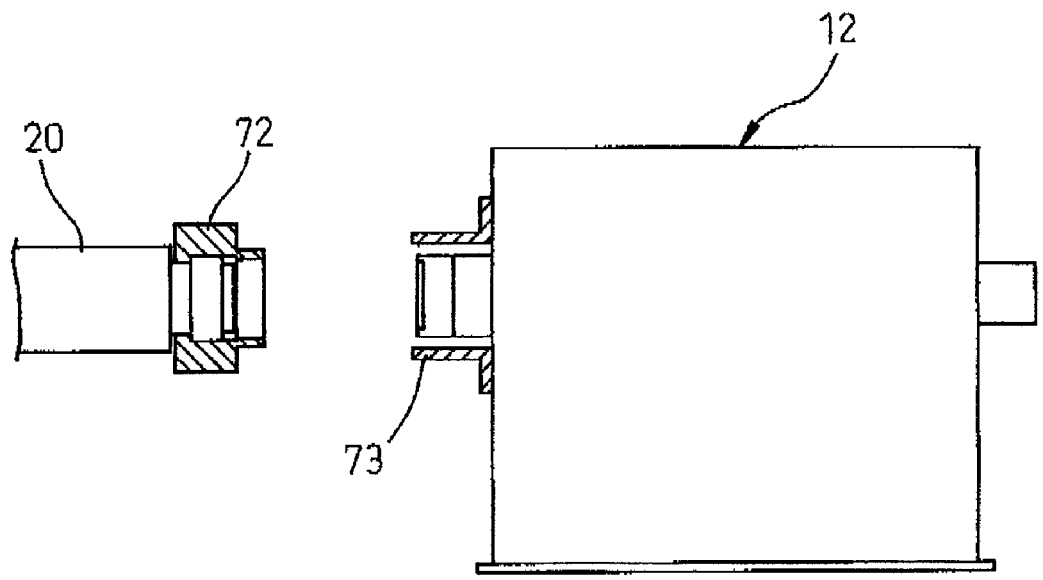
FIG. 17 is a view of an example of a connector connection method for connecting a hand cable according to the present invention to an electromagnetic valve box; and, FIG. 18 is a view of an example of a grommet connection method for connecting a hand cable according to the present invention to an electromagnetic valve box.

FIG. 17 is a view showing a method of connecting hand cable 20 to electromagnetic valve box (tool managing and relaying device) 12. Plug connector 72 is provided on one end of hand cable 20, and receptacle connector 73 is provided on electromagnetic valve box 12. Hand cable 20 is connected to electromagnetic valve box 12 by connector connection of plug connector 72 and receptacle connector 73. When hand cable 20 is to be replaced, a connecting screw in plug connector 72 needs to be loosened, and a hand needs to be inserted in this portion. In order to reduce the interference radius of the rear portion of forearm 7, it is desirable to insert a part of plug connector 72 into the inside of receptacle connector 73. In this case, however, it is difficult to loosen the connecting screw, so that electromagnetic valve box 12 needs to be displaced to the rear portion of forearm 7.

Figure 18:
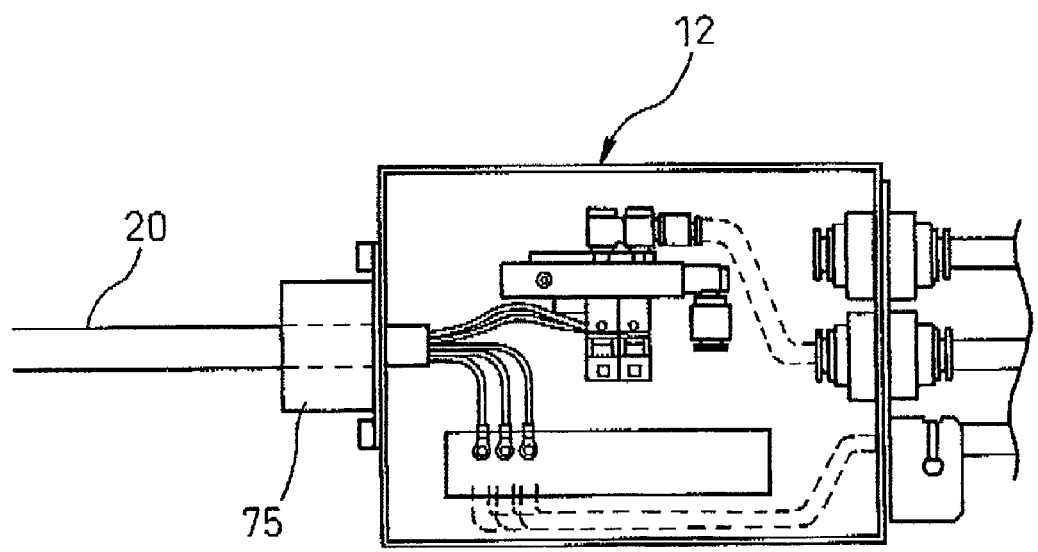

FIG. 18 shows an example of grommet connection. Grommet 75 is provided on electromagnetic valve box 12 with a pneumatic device such as an electromagnetic valve mounted thereon, and hand cable 20 is fixed to grommet 75. Hand cable 20 is finally connected to the electromagnetic valve or a terminal block in electromagnetic valve box 12. When hand cable 20 is to be replaced, a ceiling cover of electromagnetic valve box 12 is removed, and hand cable 20 is disconnected. In this state, grommet 75 is loosened, and hand cable 20 is pulled out from grommet 75. Space is necessary in order to loosen grommet 75, and if grommet 75 is inserted into a hole, it is not possible to loosen the grommet and electromagnetic valve box 12 needs to be moved to the rear portion of forearm 7.

With the construction as described above, by modifying the method for holding conduit 13 such that conduit 13 is held on second wrist element 9, and conduit 13 can be slid in the axial direction and slidably rotated in the circumferential direction in forearm 6, umbilical-member-containing robot 22A has the simple construction wherein a robot user can pass umbilical-member 20, 20A connected to work tool 12, 12A freely after introduction of the robot, and can achieve stable behavior of umbilical-member 20, 20A so that maintenance of umbilical-member 20, 20A can be improved.

The invention claimed is:

1. An umbilical-member processing structure for an industrial robot which comprises a forearm having a tool managing and relaying device and a wrist with a proximal end rotatably connected to said forearm and having a work tool mounted on a distal end of said wrist, with an umbilical-member connected to said work tool being disposed to run along said wrist via said tool managing and relaying device:

wherein said forearm has a first reduction gear which reduces a rotational speed of a driving source to rotationally drive said wrist, said first reduction gear having a first insertion hole for passing said umbilical-member into said first insertion hole; and, wherein said wrist comprises a first wrist element having a through-path in communication with said first insertion hole and rotatably connected to said forearm, and a second wrist element having a second insertion hole in communication with said through-path and rotatably connected to said first wrist element; and, wherein a conduit for passing said umbilical-member from one end to the other end is provided in said first insertion hole of said forearm, in said through-path of said first wrist element, and in said second insertion hole of said second wrist element; and, wherein, with one end of said conduit being inserted in said first insertion hole so as to permit a movement in an axial direction and in a direction of outer circumference of said conduit, the other end of said conduit is held on said second wrist element in a cantilever fashion by a conduit holding member so as to restrict a movement of said conduit in said axial direction of said conduit.

2. An umbilical-member processing structure for an industrial robot according to claim 1, wherein said conduit has a ring-shaped groove on an outer circumferential surface, and said conduit holding member has a convex portion on an inner surface for engagement with said groove, and, wherein, while said conduit is held by said conduit holding member, said convex portion engages with said groove so that said conduit is held on said second wrist element in said cantilever fashion so as to permit a rotation of said conduit in said direction of outer circumference of said conduit.

3. An umbilical-member processing structure for an industrial robot according to claim 1, wherein an end portion of said conduit inserted in said first insertion hole is covered with a tubular pipe member.

4. An umbilical-member processing structure for an industrial robot according to claim 1, wherein said conduit holding member is fixed to said second wrist element at a position offset from a rotation axis of said second wrist element.

* * * * *